Patented June 16, 1925.

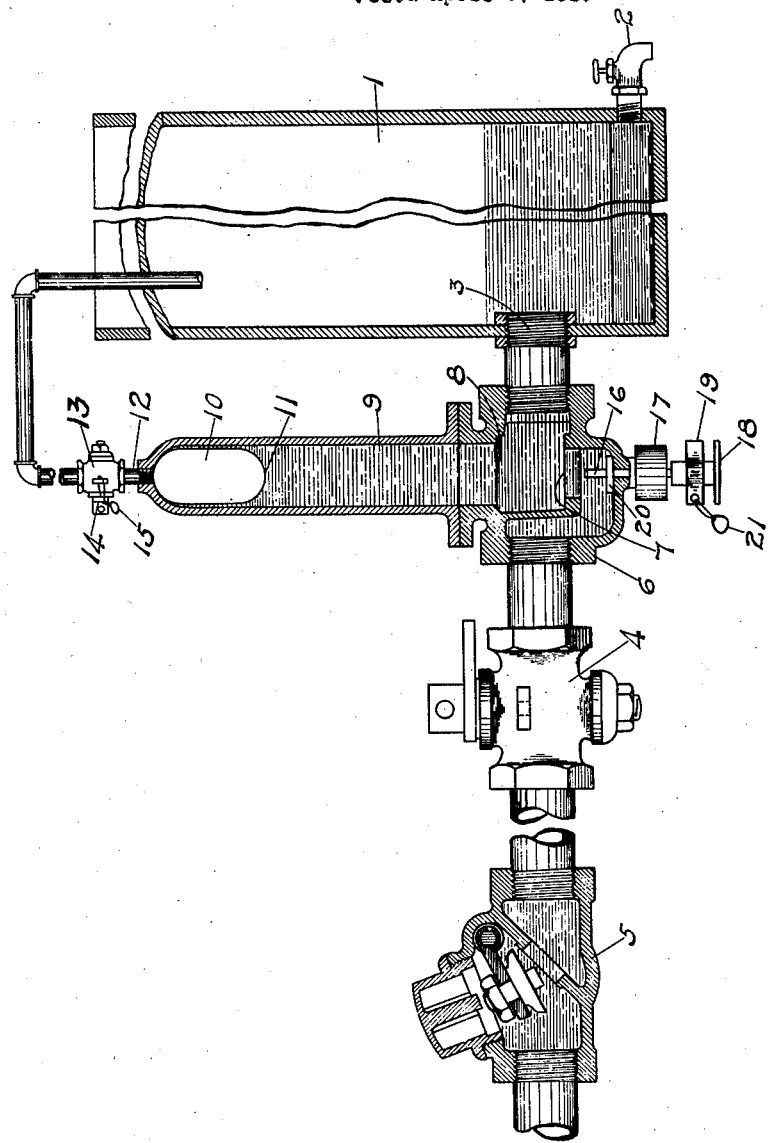

1,542,036

UNITED STATES PATENT OFFICE.

RUDOLPH CONRADER, OF ERIE, PENNSYLVANIA.

TANK-DISCHARGE-CONTROLLING DEVICE.

Application filed April 9, 1919. Serial No. 288,867.

*To all whom it may concern:*

Be it known that I, RUDOLPH CONRADER, a citizen of the United States, residing at Erie, in the county of Erie and State of Pennsylvania, have invented new and useful Improvements in Tank-Discharge-Controlling Devices, of which the following is a specification.

The invention is designed to control the discharge of tanks especially oil tanks so as to prevent the introduction of air to the pipe line. The device is also designed to obviate the carrying of water into the pipe line.

In the drawing 1 marks the oil tank, 2 a draw-off valve, 3 a discharge passage for the discharging of oil, 4 a cut-off valve in the discharge passage 3, and 5 a check valve in the discharge passage preventing a back-flow to the tank.

The controlling device has a valve body 6 in which there is arranged a diaphragm having a valve seat 7. An opening 8 is provided directly above the seat and a float stand-pipe or chamber 9 extends upwardly from the opening 8. A float 10 is arranged in the stand-pipe and a valve 11 is formed on the bottom of the float and is adapted to make a closure on the seat 7. An air controlling pipe 12 extends from the upper end of the stand-pipe or chamber 9 and preferably discharges to the tank so that any slight amount of oil that may be trapped in the pipe may be carried into the tank. A stop valve 13 controls the air discharge pipe 12. The handle 14 of the stop valve is designed to be locked in closed position and sealed by a seal 15.

The operation of the device is as follows: Water is first drawn off through the draw-off valve 2. The float 10 is in its lower position with the valve 11 seating on the seat 7. The stop 13 is closed and the stand-pipe 9 is filled with air that is trapped in the chamber after the completion of the preceding operation and the filling of the tank. The valve 13 is opened permitting the discharge of the air in the stand-pipe and the filling of the stand-pipe with oil thus carrying the float 10 to its upper position as shown in the drawing. The stop 13 is then closed thus trapping the liquid in the stand-pipe 9. The valve 4 is opened so that the discharge pipe 3 is subjected to the suction of the pipe line. The liquid in the tank is then discharged and as it reaches a level at the top of the discharge pipe 3 air is admitted over the liquid at the top of the pipe 3 to the stand-pipe 9. The level of liquid in the stand-pipe 9 immediately falls to that of the tank and the valve 11 is carried to the seat 7 thus closing off the discharge while the seat is still covered with liquid. In this way the air is prevented from entering the pipe line. The stop 13 remains closed and is sealed and the stop 4 is also closed and the tank 1 is filled in the ordinary operation of oil wells delivering thereto. As the oil level rises it closes the air connection through the upper part of the pipe 3 and air is trapped in the stand-pipe 9. The float 10, therefore, is arranged in its lower position with the valve 11 on the seat 7. The valve 11, therefore, prevents any leakage of oil should the valve 4 have some leakage.

In order to provide against the sticking of the valve 11 on the seat 7 I have arranged a stem 16 which extends through a gland 17 in the valve body. The stem is concentric with the opening through the seat 7. The stem is provided with a handle 18 for convenience in operating the stem. As the stem is pushed upwardly it contacts the valve and forces it from its seat. A closure plate or disc 20 is preferably provided on the stem by means of which the passage through the seat is closed after the valve is forced from the seat thus preventing the draft of liquid through the seat from holding the valve adjacent to the seat.

A lock 19 is preferably provided on the stem 16 between the handle 18 and gland 17. This locking plate prevents the operation of the stem 16 and the locking plate 19 is protected by a seal 21. The seals on the valve 13 and the locking plate 19 are important in that the operation of either would tend to move the valve 11 from the seat 7 prior to the time it is desired to empty the tank and its utility as a check on the valve 4 would be lost.

It will be noted that the seat 7 is at a level to permit the drainage of the water from the valve passage above the seat when the water is drawn off from the tank so that the introduction of water to the pipe line may be avoided as well as the air.

It will be noted that when the valve 13 is opened the oil rises in the pipe above the valve and when the valve is again closed this oil is trapped in the pipe and forms to some extent an oil seal for the valve and the column to some extent also balances the air pressure below the valve, thus preventing leakage through the valve.

It will be noted that the controlling valve is between the tank and the shut-off valve 4. This is of some importance because if any repairs are to be made the controlling valve may be removed without opening the line. Inasmuch as the line is under suction at practically all times the opening of the line is a matter of some consequence.

It will be noted that with the valve on the seat 7 it will be subjected to the suction on the line when the valve 4 is opened. The operator can be apprized, therefore, of the fact that there is suction on the line when he undertakes to displace the valve 11 by the movement of the stem 16. The head of fluid in the tank will be exerted on this valve but there will be a very distinct difference in the resistance to displacement when there is suction present and when there is not. Consequently the gauger is immediately advised as to whether the line is under suction so as to discharge the tank when he opens the valve 11.

In the ordinary operation of the device the gauger opens the valve 13 allowing the chamber to fill with liquid and under these circumstances the float rises. He then closes the valve 13 and opens the valve 4 and if there is suction on the line liquid begins to pass through the opening through the seat 7. It will be understood that the surface of the tank is so large that some little time is required to observe whether there is a movement of liquid, or a normal movement of liquid. With this device the gauger can readily ascertain what the forcing pressure on the liquid is either by reason of the head in the tank or suction on the line by moving the disc 20 up into the opening through the seat 7. The head through the opening will exert pressure on the disc which will be communicated through the stem to the handle 18 and this variation of pressure will apprize the gauger immediately of the available head, either gravity or suction, moving the liquid through the line. It is obvious that there will be a marked difference in this pressure where there is a suction as well as gravity head so that the gauger can readily detect the presence of suction on the line.

The device also acts or may be utilized to detect the presence of air in the line when the parts are in the position shown in the drawings. The introduction of air into the conduit has an immediate response in the closing of the valve by the air releasing the liquid in the float chamber 9.

What I claim as new is:—

1. In a tank discharge controlling device, the combination of a valve body having a valve passage therethrough and a seat; a float chamber above the seat; a float in the chamber; and a valve directly connected to and controlled by the float and operating on the seat, said float chamber being of sufficient height to maintain when filled the float and valve above the draft of the fluid passing through the seat.

2. In a tank discharge controlling device, the combination of a valve body having a passage therethrough and a valve seat; and a closed chamber above the passage, the inlet to the passage being connected to the bottom of the chamber to permit the introduction of air to the chamber as the liquid level recedes prior to exposing the valve seat.

3. In a tank discharge controlling device, the combination of a valve body having a passage therethrough and a valve seat; a closed chamber above the passage, the inlet to the passage being connected to the bottom of the chamber to permit the introduction of air to the chamber as the liquid level recedes prior to exposing the valve seat; and a valve controlled discharge passage for the chamber.

4. In a tank discharge controlling device, the combination of a valve body having a valve passage therethrough and a seat; a float chamber above the seat; a float in the chamber; a valve controlled by the float and closing and opening by a movement toward and from its seat said valve being attached to the float and moving with it; a valve controlled discharge passage leading from the chamber; and means for forcing the valve from the seat.

5. In a tank discharge controlling device, the combination of a valve body having a valve passage therethrough and a seat; a float chamber above the seat; a float in the chamber; a valve controlled by the float; a valve controlled discharge passage leading from the chamber; and means for closing the passage through the valve body to relieve the float valve from a discharging draft through the valve passage.

6. In a tank discharge controlling device, the combination of a tank; a discharge conduit leading from the tank adjacent to but above the bottom of the tank; a discharge valve body connected with the conduit having a passage therethrough and a seat, the seat being at a level relatively to the conduit to permit drainage from the body and at the seat through the conduit to the tank; a float chamber above the seat; a float in the chamber; and a valve controlled by the float and operating on the seat, the float chamber being in communication with the conduit with the valve closed.

7. In a tank discharge controlling device, the combination of a valve body having a valve passage therethrough; a float chamber; a float in the chamber; and a valve controlled by the float and controlling the valve passage, said chamber being closed to maintain a column of liquid and consequently a float level above the tank level as it recedes until the tank level reaches a pre-determined lower level.

8. In a tank discharge controlling device, the combination of a valve body having a valve passage therethrough and a seat; a float chamber above the seat; a float in the chamber; and a valve controlled by the float and operating on said seat, said chamber trapping the air after a discharge operation and maintaining a liquid level operating on the float below the connected tank level whereby the float may remain on the seat and affect a closure.

9. In a tank discharge controlling device, the combination of a valve body having a valve passage therethrough and a seat; a float chamber above the seat; a float in the chamber; a valve carried by the float and operating on the seat; means for forcing the valve from its seat; and means for closing the passage through the valve body to relieve the float valve from a discharging draft through the valve passage when forced from its seat.

10. In a tank discharge controlling device, the combination of a valve body having a valve passage therethrough and a seat; a float chamber above the seat; a float in the chamber; a valve controlled by the float; and a valve controlled discharge passage leading from the chamber, the passage being extended above the valve forming an oil receptacle above the valve forming an oil seal on said valve.

11. The combination of a conduit; means acting with the introduction of air from the conduit to said means for closing the conduit; and devices for discharging the air so introduced.

12. The combination of a conduit; a float chamber above the conduit; a float in the chamber normally above the flow of liquid through the conduit; and a valve controlling the conduit and closed by the float with the introduction of air to the chamber from the conduit.

13. In a tank discharge controlling device, the combination of a float chamber having inlet and discharge passages in the bottom portion thereof; a valve controlling the flow through the chamber; and a float in the chamber having a connection with the valve, said float and valve rising in operation above the inlet and discharge passages.

14. In a tank discharge controlling device, the combination of a float chamber having inlet and discharge passages in the bottom portion thereof; a valve controlling the flow through the chamber; and a float in the chamber having a connection with the valve, said float and valve rising in operation above the inlet and discharge passages, said float being vertically elongated.

In testimony whereof I have hereunto set my hand.

RUDOLPH CONRADER.